INVENTOR.
DEAN F. BABCOCK
BY Marvin Moody
ATTORNEY

OUTPUT OF PHASE DETECTOR FOR VARIOUS COMBINATIONS OF FILTERS

INVENTOR.
DEAN F. BABCOCK
BY [signature]
ATTORNEY

MECHANICAL FILTER FREQUENCY DISCRIMINATOR

Filed Dec. 14, 1955 4 Sheets-Sheet 3

INVENTOR.
DEAN F. BABCOCK
BY Marvin Moody
ATTORNEY

June 24, 1958 D. F. BABCOCK 2,840,640

MECHANICAL FILTER FREQUENCY DISCRIMINATOR

Filed Dec. 14, 1955 4 Sheets-Sheet 4

INVENTOR.
DEAN F. BABCOCK
BY Marvin Moody
ATTORNEY

United States Patent Office 2,840,640

Patented June 24, 1958

2,840,640

MECHANICAL FILTER FREQUENCY DISCRIMINATOR

Dean F. Babcock, Tarzana, Calif., assignor to Collins Radio Company, Cedar Rapids, Iowa, a corporation of Iowa Application December 14, 1955, Serial No. 553,000

7 Claims. (Cl. 250—36)

This invention relates in general to phase detectors, and in particular to an apparatus capable of phase detecting a plurality of frequencies which are related to each other in a predetermined manner so as to stabilize a plurality of different frequencies rather than a single frequency.

Automatic frequency controls have become very common in receivers and transmitters and are used to maintain a receiver or transmitter tuned to a predetermined frequency. For example, if an incoming signal has a frequency of 14.235 megacycles which is heterodyned with a local oscillator, variations of the local oscillator frequency and/or the transmitted frequency will cause variations in the intermediate frequencies. Thus, generally the local oscillator frequency is controlled by an automatic frequency control which utilizes a discriminator circuit.

Such circuits are well known to those skilled in the art and are based on the principle that certain phase shifts occur for a particular frequency in a discriminator circuit. At the desired frequency the phase shift is such that the output of the phase detector is zero; however, drift away from this frequency produces a D. C. output proportional to the deviation and with a polarity determined by and peculiar to the direction of deviation. Thus, the apparatus may be tuned and maintained at a fixed frequency.

The present invention features a unique frequency discriminator which produces zero output when any one of a plurality of inputs which are related to each other in a predetermined manner is received in the equipment.

Assume that a plurality of subcarriers are to be transmitted, each subcarrier carrying its own intelligence in the form of frequency modulation, phase modulation, or amplitude modulation. The separation of the subcarrier frequencies is an extremely small percentage of the carrier frequency. To receive and detect a plurality of such subcarriers being simultaneously transmitted necessitates heterodyning to an I. F. frequency range to increase the separation percentage and applying the I. F. frequency to a highly selective frequency separating device, such as a parallel bank of sharply tuned filters, for example. This scheme requires a high degree of stabilization in the I. F. frequencies, therefore means must be employed to control the injection oscillator frequency so as to insure that the I. F. frequencies are locked at the proper value. A. F. C. circuitry which develops an output control voltage from a single input frequency could not be used as a control means where the input consists of a plurality of frequencies very closely spaced in the spectrum. Further, no reliable means could be used to separate a single frequency to be used in a single control circuit, since such separation means would be highly selective and thus defeat the purpose of control. This invention therefore provides a novel discriminator circuit with a repetitive transfer characteristic which will provide a control error voltage proportional to the average error of a plurality of predetermined input frequencies.

This invention utilizes the phase shifting characteristics of electromechanical filters such as described in Patent No. 2,717,361, titled "Mechanical Filters," which issued on September 6, 1955, to Melvin L. Doelz and is assigned to the assignee of the present invention. The filters are employed as phase shifting devices in an automatic frequency control circuit, whereby frequency stabilization is realized for a plurality of closely spaced frequencies in but a single discriminator circuit.

I have found that the phase shift characteristic of the above referenced mechanical filter is such that as an input frequency traverses the passband of the filter, the phase shift between input and output varies approximately linearly from zero to $\pi$ radians per resonant section. A filter possessing $n$ resonant sections, therefore, has a phase shift characteristic defined as a linear variation from zero through $n\pi$ radians. Therefore, by phase shifting a given input frequnecy in two channels, each employing a discretely different number of resonant sections, the output phase relationship varies in a circular fashion through in-phase, quadrature-phase and out-of-phase relationships as the input frequency traverses the filter passband. This phase-difference characteristic is repetitive across the filter passband and, in general, a number of quadrature-phase relationships are experienced, which increases in number as the difference in the number of resonant sections in the two phase shifting channels is increased. If then, the output of the two phase shifting channels is applied to a phase detector, the phase detector will produce a plurality of zero outputs corresponding to those input frequencies within the filter passband which so lie in the passband spectrum that the phase shift experienced in the two filter sections is a quadrature relationship.

In this invention a plurality of subcarrier frequencies are modulated upon a carrier, the modulated carrier is received, amplified, and applied to a mixer. A variable frequency oscillator beats against the modulated carrier within the mixer to develop each of the corresponding I. F. frequencies lying within the filter passband which are stabilized by the multi-frequency discriminating circuitry. Should any one of the subcarriers vary in frequency, or should the carrier frequency drift or the variable frequency oscillator drift, an error voltage is developed in the detector which changes the oscillator frequency to correct for any frequency error in the I. F. frequencies.

It is an object of this invention, therefore, to provide a multi-frequency discriminator circuit.

A further object of this invention is to provide a single discriminator circuit which provides zero output for a plurality of predetermined input frequencies rather than a single input frequency.

Another object of this invention is to employ electromechanical phase shifting means in an automatic frequency control circuit.

Still another object of this invention is to stabilize a plurality of closely spaced frequencies in a single automatic frequency control circuit employing a common injection oscillator frequency.

Further features, objects and advantages of this invention will become apparent from the following description and claims when read in view of the drawings, in which Figure 1 is a graphic illustration of the approximate phase characteristics of electromechanical filters as a function of the number of resonant sections;

As described in the above-referenced patent to Doelz entitled "Mechanical Filters," each such device is comprised of a plurality of metal discs joined together by coupling rods attached to their peripheries and which have input magnetostrictive means connected to the peripheries of the first disc and output magnetostrictive coupling means attached to the periphery of the last disc. Such filters may be used in electronic circuits such as passband filters and they have very sharp cutoff points. In such devices the number of discs in general determines the amount of rectangularity in the passband characteristic. The center frequency of the passband is varied by changing disc dimensions, and the width of the passband is determined by the diameters and number of coupling rods and magnetostrictive coupling elements.

Figure 1:
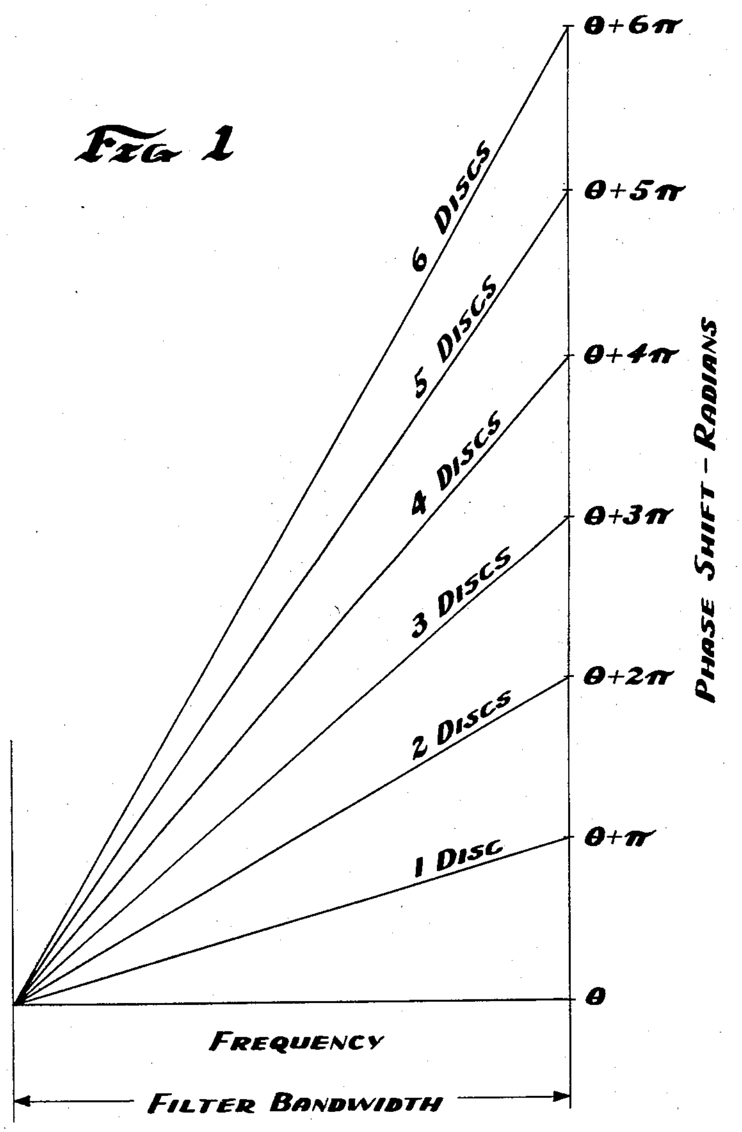

This invention utilizes the phase shifting characteristic of the above-described electromechanical filter, in that the phase shift across the passband in such a filter is approximately linear as shown in Figure 1. The amount of phase shift experienced as the frequency traverses the passband has been found to depend on the number of resonant sections (discs) in the filter. The phase shift has further been found to be approximately equal to $\pi$ radians per resonant section. Figure 1 illustrates this characteristic for filters having various numbers of resonant sections. The factor $\theta$ represents the reference phase angle of the input frequency.

Phase detecting circuits are known in the art wherein a zero output is realized when two applied signals are in phase quadrature relationship and a maximum positive or negative output is developed for conditions of in-phase inputs and 180° out-of-phase inputs, respectively.

Figure 2:
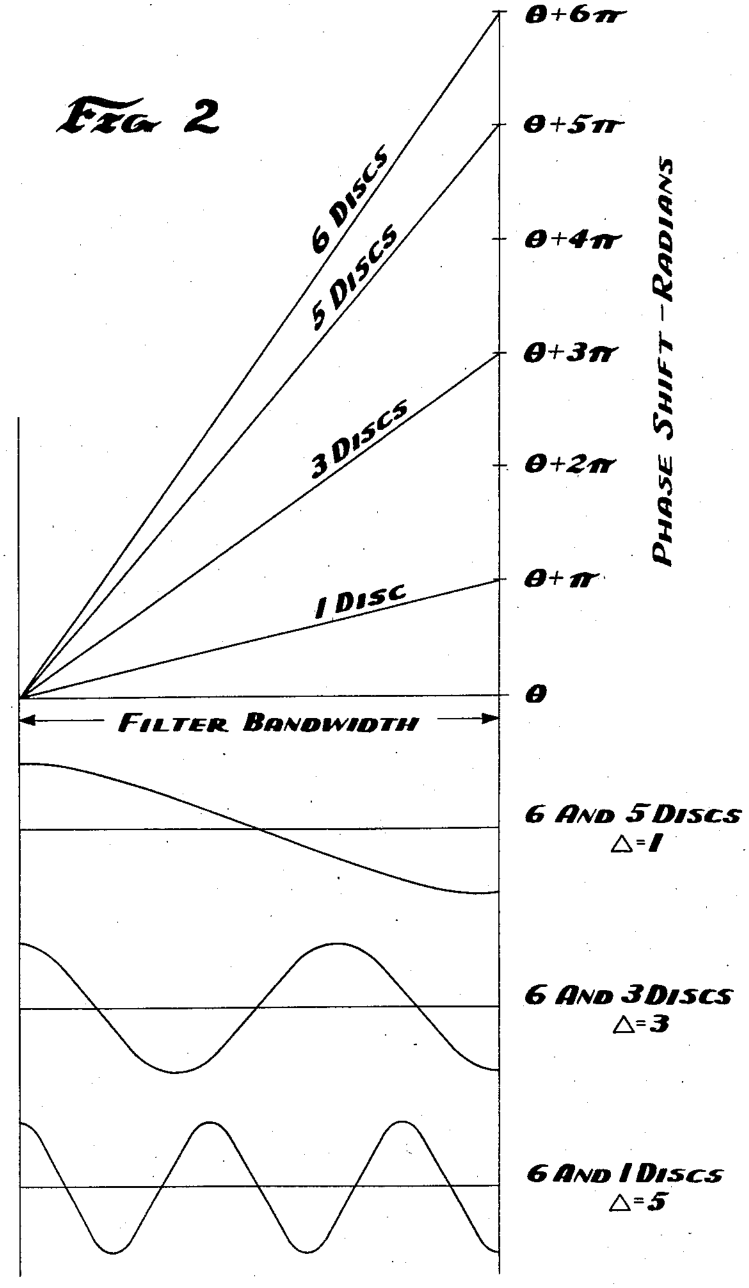
Figure 2 is a graphic illustration of phase detector output characteristics for various combinations of electromechanical filter resonant sections.

In this device, the outputs of two electromechanical filters having a different number of resonant sections are applied to such a phase detector. As illustrated in Figure 2, the outputs from two filters having a different number of discs will, within the filter passband, be in quadrature-phase relationship a number of times, depending upon the difference in the number of discs. Figure 2 is a plot of phase detector output versus filter passband frequency where the input frequency is applied individually to mechanical filters with different numbers of discs. Phase shift characteristics (and hence phase detector output characteristics) for filters having 1, 3, 5, and 6 discs are plotted as linear variations across the filter passband from $\theta$ (reference angle) degrees to $\theta+\pi$, $\theta+3\pi$, $\theta+5\pi$, and $\theta+6\pi$ radians, respectively. Note that these phase shifts correspond to $\pi$ radians per disc as discussed above.

At points where the outputs of the two filters are in phase (zero, $2\pi$, $4\pi$, etc.) a maximum positive voltage will be derived from the phase detector. At points at which the outputs of the filters are in quadrature-phase relationship $$\left(\frac{\pi}{2}, \frac{3\pi}{2}, \frac{5\pi}{2}, \text{etc.}\right)$$

zero voltage will be obtained from the phase detector. At points where the outputs are 180° out of phase ($\pi$, $3\pi$, $5\pi$, etc.) a maximum negative voltage will be obtained from the phase detector. Figure 2 illustrates the resulting phase detector output characteristics as a function of input frequencies as they traverse the passband of the mechanical filters. Thus, passing the input frequency through a 5-disc and 6-disc filter combination is seen to result in a single negative slope detector output characteristic designated as $\Delta=1$, where $\Delta$ is the difference in the number of discs. Similarly, a plot is shown for a 6-disc and 3-disc filter combination ($\Delta=3$) and shows that three zero points are realized with two such zero points falling on symmetrical negative slopes in the detector output characteristic. A plot for $\Delta=5$, correspondingly, shows that five zero points are realized with three such points occurring on symmetrical negative slope portions of the phase detector characteristic. From the above it becomes apparent that for a filter of a given passband, the number of zero points (N) occurring at symmetrically spaced negative-slope portions of the phase detector output characteristic is determined by the relationship $$N=\frac{\Delta+1}{2} \tag{1}$$

where $\Delta$ is the difference in the number of discs in the two filters, and is an odd integer (1, 3, 5, 7, etc.)

An analysis of the detector characteristic for $\Delta$ factors which are even integers (2, 4, 6, etc.) shows that the maxima and minima appear symmetric with respect to the filter passband such that an even number of quadrature (zero) points is present. Half of the quadrature points will occur on negative slope portions of the characteristic, and half on positive slope portions. Therefore, the selection of operating points on either the positive or negative slope portions of the characteristic results in operating points asymmetrical with respect to the center frequency of the passband. Further, for every odd $\Delta$ factor (1, 3, 5, etc.) which permits a number of symmetrically spaced operating points, N, on negative slope portions of the detector characteristic, there is an even factor one greater than $\Delta$ (2, 4, 6, etc.) which permits but N operating points on the negative slope portions, but the operating points are displaced from a symmetric relationship with respect to the center frequency of the passband. Use of the even $\Delta$ factor necessitates a reduced separation between operating points. The relationship expressed in Equation 1, above, therefore, is preferably limited to values of $\Delta$ which are odd integers, since the choice of even integers results in operation unnecessarily displaced toward one side of the filter passband, and reduces the separation of operating frequencies without gaining additional operating points over an application using an odd $\Delta$ factor. The reduced frequency separation resulting from the choice of a $\Delta$ factor one greater than an odd factor is due to the inherent increased periodicity in the detector characteristic as frequency traverses the filter passband.

In a multi-frequency receiver system such as to be described herein, the number of operating frequencies is determined by the above relationship in that the frequencies are chosen so as to fall within the frequency spectrum defined by the filter passband, and are further so spaced within the filter passband frequency spectrum that they correspond to the desired zero points on the phase detector output characteristic.

Figure 3:
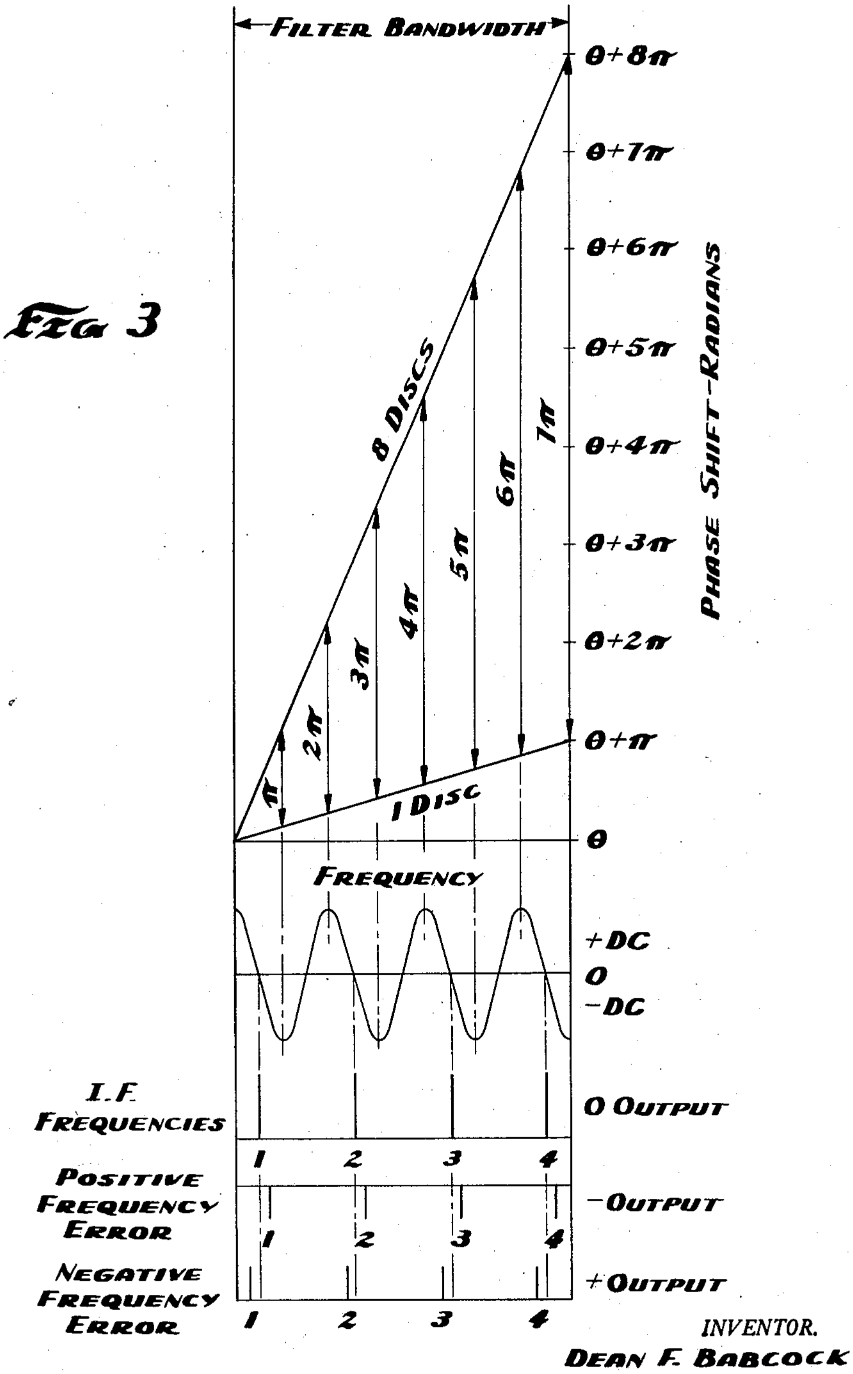
Figure 3 is a graphic illustration of the four-frequency spectral distribution and discriminator principle of this invention.

A further analysis of the detector curves of Figure 3 shows that bandwidth in terms of input frequency separation and the factor $\Delta$ may be expressed by $$BW=\frac{\Delta}{2}\times\text{frequency separation} \tag{2}$$

An application of the above principles is shown in Figure 3 in which detector characteristics and filter phase shift characteristics are shown for a four-frequency application. From Equation 1, above, the factor $\Delta$ becomes equal to seven when the number of subcarriers N equals four. Thus, two filters are chosen wherein the difference in the number of active resonant sections is seven. For illustration purposes two such filters are indicated as having eight sections and one section, respectively, to arrive at the $\Delta$ factor of seven. It is to be understood, however, that in an actual application, the number of discs in each filter for a four-frequency system is determined by the factors ($n$) and ($n-7$) respectively, i. e., two filters must be used such that the difference in the number of resonant sections is seven; however, the number of discs in each filter is arbitrary so long as the difference factor $\Delta$ is maintained. In a practical application, since the shape of the passband of an electromechanical filter generally becomes more rectangular with addition of discs, two such filters having fourteen and seven discs, respectively, might be used, for example.

Figure 3 shows the phase shift characteristics across the filter passband for filters having one disc and eight discs, respectively. The resulting phase detector characteristic is seen to possess four equally spaced zero points at negative slope portions within the filter passband, and said zero points are symmetrically spaced about the center frequency of the filter passband. The four operating frequencies in this system must then be at frequencies which are located in these spectral points within the filter passband. The four input frequencies are indicated in Figure 3 as 1, 2, 3, and 4. Detector outputs for positive and negative frequency excursions are also indicated in relationship to the frequency spectrum.

Suppose it is desired to have a four-frequency system stabilized by the devices of this invention. The multi-frequency system is shown functionally in Figure 4. Assume that equally spaced frequencies $f_m$ (where $m$ equals 1, 2, 3, 4) represent subcarriers upon a carrier $f_c$. By the devices of this invention four highly stabilized I. F. frequencies $f_{(I.\ F.)m}$ corresponding to the above subcarriers will be developed.

Input to antenna 10 is a carrier $f_c$ modulated at one of the four chosen subcarriers $f_m$. The received R. F. signal $(f_c+f_m)$ is amplified in R. F. amplifier 11 and applied as one input to a mixer 12. A controlled injection frequency $f_c+f_m-f_{(I.\ F.)m}$ from variable frequency oscillator 13 is applied as a second input to mixer 12; such that an I. F. output $f_{(I.\ F.)m}$ corresponding to each transmitted subcarrier $f_m$ is developed which lies at one of the four discrete phase detector zero points defined within the passband of the mechanical filters 14 and 15. The difference frequency output, $f_{(I.\ F.)m}$, from mixer 12 is applied to the input of each of the two mechanical filters 14 and 15. The outputs of mechanical filters 14 and 15 $(f_{(I.\ F.)m})$, phase shifted in accordance with the principle of Figure 3, are applied to a phase detector 16. A D. C. output voltage is developed in phase detector 16 which is proportional in magnitude to the average I. F. frequency deviation. The phase detector output is applied to an automatic frequency control 17, which alters the frequency of variable frequency oscillator 13 to compensate for the error in the I. F. frequencies. The automatic frequency control 17 might consist of, for example, a reactance tube which operates in conjunction with oscillator 13 to vary its frequency.

Oscillator 13 operates at a constant frequency so long as the carrier frequency is constant and the subcarrier components $f_m$ do not deviate from their predetermined values. This feature of the invention becomes evident from Figure 4 where the variable frequency oscillator is shown to be at a frequency equivalent to $f_c+f_m-f_{(I.\ F.)m}$. Assuming a constant $f_c$ and four values of $f_m$ with a discrete frequency separation, the increase in the component $(f_c+f_m)$ due to equal increases in the value of $f_m$ is followed by a corresponding increase in $f_{(I.\ F.)m}$ and the variable frequency oscillator remains constant.

The stabilized I. F. frequencies developed in mixer 12 are taken from the output of filter 14 and applied to a frequency selecting device 18 which separates the individual intelligence channels $f_{(I.\ F.)1,2,3,4}$ for individual detection. It is to be understood, of course, that the I. F. frequencies may be taken from the output of filter 15 as well.

The stabilized I. F. frequencies developed in mixer 12 corresponding to each of the four subcarriers modulated on the carrier are spaced symmetrically about the center frequency of the mechanical filter according to the principles outlined in Figure 3.

As a specific example of a four-frequency system, assume that equally spaced subcarriers of one kilocycle, two kilocycles, three kilocycles, and four kilocycles are modulated upon a carrier frequency of one megacycle. From Equation 2 above, considering that the $\Delta$ factor for a four-frequency system is to be equal to seven and the frequency separation is one kilocycle, the required filter bandwidth becomes $$BW=\frac{7}{2}\times 1=3.5 \text{ kilocycles}$$

Filters such as described in the above referenced patent to Doelz are available with bandwidth center frequencies of, for example, five hundred kilocycles.

The choice of a five hundred kilocycle center frequency for the filters 14 and 15 determines the passband limits of the filters 14 and 15 which are defined by $$500\pm\frac{3.5}{2} \text{ kilocycles}$$

or 498.25 and 501.75 kilocycles, respectively. The four frequencies then, fall at the symmetrically spaced quadrature phase points defined by Figure 3, which would be 498.5 kilocycles, 499.5 kilocycles, 500.5 kilocycles, and 501.5 kilocycles, respectively. The variable frequency oscillator 13 must then operate at a frequency defined as the sum of the carrier frequency and particular subcarrier frequency minus the corresponding I. F. frequency, or 502.5 kilocycles. The variable frequency oscillator 13 operates about this single defined frequency for reception and stabilization of any one of the four frequencies. This may be illustrated in the following tabulation based on a carrier frequency of 1000 kilocycles and a mechanical filter center frequency of 500 kilocycles.

| | Sub-carrier Frequency $f_m$ | Subcarrier Frequency $f_m$ Plus Carrier Frequency $f_c$ | Stabilized I. F. Frequency $f_{(I.\ F.)m}$ | Variable Frequency Oscillator $f_c+f_m-f_{(I.\ F.)m}$ |
|---|---|---|---|---|
| | Kc. | Kc. | | |
| Subcarrier 1 | 1 | 1,001 | 498.5 | 502.5 |
| Subcarrier 2 | 2 | 1,002 | 499.5 | 502.5 |
| Subcarrier 3 | 3 | 1,003 | 500.5 | 502.5 |
| Subcarrier 4 | 4 | 1,004 | 501.5 | 502.5 |

Should the I. F. frequencies corresponding to subcarriers 1, 2, 3, and 4 shift from their defined values, an error voltage is developed in phase detector 16 and the the frequency of variable frequency oscillator 13 is correspondingly shifted by automatic frequency control 17 so that the I. F. frequency is corrected to the defined value, wherein the error voltage is reduced to zero. Such frequency correction is realized should the I. F. frequencies corresponding to the four input frequencies shift from their assigned values.

Thus, the four frequencies are seen to be stabilized by a single variable frequency oscillator injection frequency. This is due to the fixed separation of the frequencies and their symmetrical displacement within the filter passband. Although the above example shows the development and stabilization of four I. F. frequencies characteristic of each of the four subcarrier frequencies, the principle of this invention might likewise be employed to recover and stabilize the actual subcarrier frequencies. For example, with the 500 kilocycle filter assumed above the four equally spaced I. F. frequencies within the passband (498.5, 499.5, 500.5, and 501.5) might be modulated on the carrier as subcarriers whereby an oscillator injection at the carrier frequency would recover the subcarriers as the difference frequencies. This is apparent from the expression for variable frequency oscillator frequency, $f_c+f_m-f_{(I.\ F.)m}$, in which the last two terms would be equal and cancel to leave only the term $f_c$, the carrier frequency.

Figures 4, 5:
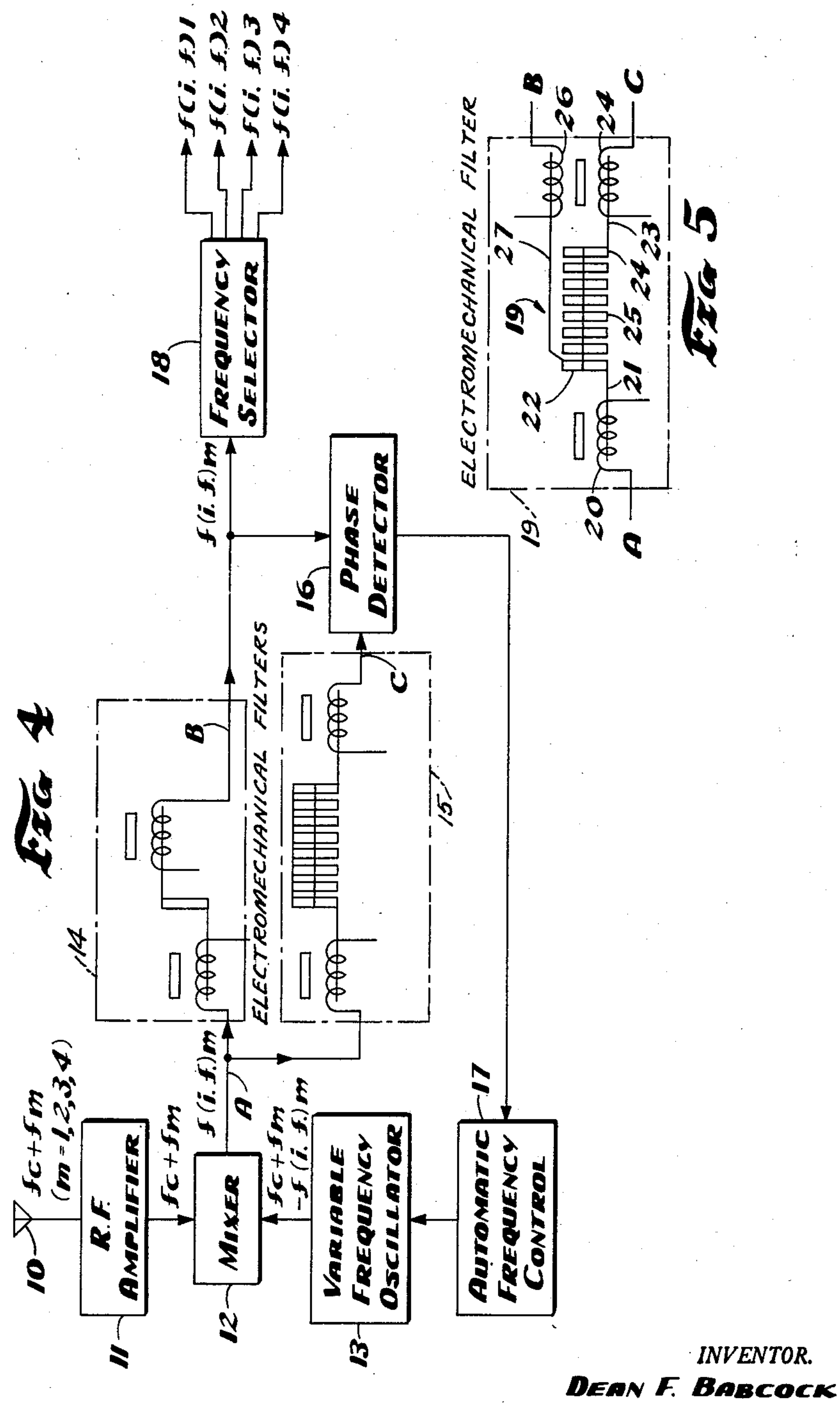
Figure 4 is a block diagram of this invention.
Figure 5 is a schematic diagram of another embodiment of the electromechanical filter section of Figure 4.

Figure 5 represents as a functional schematic a single filter with two output transducers taken from different discs, wherein the required phase shift characteristics realized above by choice of two filters having a different number of discs may also be realized by a single filter with dual output transducers. The device shown in Figure 5 might be such as the filter described in a co-pending application Serial No. 552,999, filed December 14, 1955, entitled "Two End-Wire Mechanical Filter" (assigned by Melvin L. Doelz to the assignees of the present invention). The device of Figure 5 shows three connecting points identified as A, B, and C, which may be connected into the circuit of Figure 4 at corresponding points marked A, B, and C, in place of the two filters 14 and 15. The device of Figure 5 will perform the same function with the use of but one mechaincal filter.

In this embodiment the output mixer 12 may then be applied to input coil 20 of filter 19. Input driving rod 21 is connected to the periphery of input disc 22. A first output coil 24 has a driving rod 23 connected to the periphery of output disc 24. A plurality of center discs 25 are coupled between input disc 22 and output disc 24. The number of center discs 25 for example described herein where $\Delta=7$ might be six, for example, so that the connectors A and C represent the input and output leads to a filter having eight resonant sections. A second output coil 26 is mounted on the filter with a second output driving rod 27 connected (in this example) to input disc 22 so that connectors A and B represent the input and output connectors to a mechanical filter having one resonant section. Thus connections A and B represent a one-disc filter such as individual filter 14 in Figure 4, while connections A and C represent an eight-disc filter such as individual filter 15 in Figure 4. The choice of discs is, as in the two-filter embodiment described above, for illustrative purposes only, and, for the same reasons as described above, in a practical application there might be fourteen discs in the circuit A—C and seven discs in the circuit A—B, for example. The requirement for a four-frequency discriminator remains the same as above in that one filter circuit must contain $n$ discs while the other filter circuit contains $n-7$ discs.

It is thus seen that the invention provides a multi-frequency discriminator circuit for stabilization of a plurality of frequencies. It is further evident that by the invention a single injection frequency is adequate to develop I. F. frequencies corresponding to a plurality of individually transmitted intelligences as defined by a plurality of subcarriers modulated on a carrier. Still further, it is seen that a single phase detector error circuit controls a single frequency correction means for one injection oscillator so as to stabilize a plurality of received frequencies rather than a single frequency such as was previously possible in the art.

Although this invention has been described with respect to particular embodiments thereof, it is not to be so limited, as changes and modifications may be made therein which are within the full intended scope of the invention as defined by the appended claims.

I claim:

1. A frequency stabilization system comprising an input signal consisting of a plurality of equally separated subcarrier frequencies modulated on a carrier, a mixer including input and output means, a variable frequency oscillator having frequency control means, means for connecting said input signal and said variable frequency oscillator to the input of said mixer, dual phase shifting means having an input and dual output means, each of said phase shifting means having the same passband and comprising a different plurality of resonant sections with phase shift characteristic throughout said passband varying linearly from zero to $n\pi$ radians where $n$ is the number of said resonant sections, the output of said mixer connected to the input of each of said phase shifting means, a phase detector having input and output means, means connecting the outputs of each of said phase shifting means to the input of said phase detector, said phase detector providing zero output for each output of said mixer corresponding to each said subcarrier frequency, and the output of said phase detector connected to said frequency control means of said variable frequency oscillator to vary the oscillator about a single frequency such that a frequency stabilized output from said mixer is obtained.

2. A frequency stabilization system comprising an input signal consisting of a plurality of equally separated subcarrier frequencies modulated on a carrier, a mixer including input and output means, a variable frequency oscillator having frequency control means, means for connecting said input signal and said variable frequency oscillator to the input of said mixer, electro-mechanical dual phase shifting means having input and output means, each of said phase shifting means having a different number of resonant sections and the same passband with a linear phase shift characteristic across said passband equal to $n\pi$ where $n$ is the number of said resonant sections, the output of said mixer connected to the input of each of said phase shifting means, a phase detector having dual input means and an output means, means individually connecting the outputs of said phase shifting means to the dual input means of said phase detector, said $\phi$ act having a cyclic output characteristic with a plurality of zero points for each output of said mixer corresponding to each of said subcarrier frequencies, and the output of said phase detector connected to said frequency control means of said variable frequency oscillator to vary the oscillator frequency about a single injection frequency.

3. A frequency stabilization system comprising an input signal consisting of a predetermined plurality of N equally separated subcarriers frequencies $f_m$ modulated on a carrier $f_c$, a mixer including input and output means and producing a plurality of outputs $f_{(I.\,F.)m}$, a variable frequency oscillator having frequency control means and a single output frequency equal to $f_c+f_m-f_{(I.\,F.)m}$, means for connecting said input signal and said variable frequency oscillator to the input of said mixer, dual electromechanical filter phase shifting means having magnetostrictive input and output means each of said phase shifting means having a different number of resonant sections and the same passband, each of said phase shifting means having a phase shift characteristic across its passband which varies linearly from zero to $n\pi$ where $n$ is the number of said resonant sections, the outputs of said mixer being symmetrically spaced within the passband of said phase shifting means, the output of said mixer connected to the input of said phase shifting means, a phase detector having input and output means, said phase detector producing zero output for each of a plurality of mixer inputs corresponding to said subcarrier frequencies, means connecting said phase shifting means to the input of said phase detector, and the output of said phase detector connected to said frequency control means of said variable frequency oscillator to vary the oscillator frequency.

4. Means for stabilized reception of an input signal, said input signal consisting of a plurality of equally separated subcarrier frequencies which are modulated on a carrier wave and in turn modulated with intelligence, comprising a mixer including input and output means, a variable frequency oscillator having frequency control means, means for connecting said input signal and said variable frequency oscillator to the input of said mixer, electromechanical phase shifting means, said phase shifting means consisting of first and second electromechanical filters each having magnetostrictive input and output means, said first filter having $n$ resonant sections and a phase shift characteristic varying linearly from zero to $n\pi$ radians throughout its passband, said second filter having $\Delta$ less resonant sections and a phase shift characteristic varying linearly from zero to $(n-\Delta)\pi$ radians, the output of said mixer connected to the input means of said first and second mechanical filters, a phase detector, the output means of said first filter connected to a first input of the phase detector, the output means of the second filter connected to a second input of said detector, said phase detector producing zero output for each of a plurality of inputs related to said subcarrier frequencies, and the output of said phase detector connected to said frequency control means of said variable frequency oscillator to vary the oscillator frequency.

5. A frequency stabilization system comprising an input signal consisting of a plurality of predetermined subcarrier frequencies modulated on a carrier, a mixer including input and output means, a variable frequency oscillator having frequency control means, means for connecting said input signal and said variable frequency oscillator to the input of said mixer, said mixer developing an output frequency corresponding to each of said subcarrier frequencies, a first electromechanical filter having magnetostrictive input and output means and a plurality of resonant sections, a second electromechanical filter having magnetostrictive input and output means and having fewer resonant sections than the first filter, each said filter having a linear phase shift characteristic varying from zero to $n\pi$ radians, where $n$ is the number of resonant sections, the output of said mixer connected to the input means of each of said first and second electromechanical filters, a phase detector, the output of the first electromechanical filter connected to a first input of said phase detector, the output of the second filter connected to a second input of the phase detector, said phase detector providing zero output for each of said mixer output frequencies and a control error output proportional to the average error of said subcarrier frequencies, and the output of said phase detector connected to said frequency control means of said variable frequency oscillator to vary the oscillator frequency when frequency drift has occurred.

6. Means for stabilized reception of an input signal, said input signal consisting of a plurality of predetermined equally separated subcarrier frequencies which are modulated on a carrier wave, comprising a mixer including input and output means, a variable frequency oscillator having frequency control means, said input signal and the output of said variable frequency oscillator connected to inputs of said mixer, said mixer producing an output frequency corresponding to each of said subcarrier frequencies; electromechanical phase shifting means, said phase shifting means consisting of an electromechanical bandpass filter, said filter having a magnetostrictive input means, a plurality of mechanically resonant sections including a first and a last section, said input means connected to said first resonant section, a first magnetostrictive output means connected to said last resonant section, and a second magnetostrictive output means connected to one of the plurality of resonant sections between said first and last sections, the phase shift characteristic between said input means and each said output means being a linear variation between zero and $n\pi$ radians, where $n$ is the number of resonant sections between said input means and each said output means; the output of said mixer connected to the input means of said filter, a phase detector, the first and second output means of said filter individually connected to the input of said phase detector, and the output of said phase detector connected to said frequency control means of said variable frequency oscillator to vary the oscillator about a single injection frequency so as to stabilize reception of each of said plurality of subcarrier frequencies.

7. A frequency stabilization system comprising an input signal consisting of a plurality of N equally separated subcarrier frequencies modulated on a carrier, a mixer including input and output means, a variable frequency oscillator having frequency control means, said input signal and the output of said variable frequency oscillator connected to the input of said mixer; an electromechanical bandpass filter, said filter having a magnetostrictive input means, a plurality of mechanically resonant sections including a first and a last section, said magnetostrictive input means connected to said first resonant section, a first magnetostrictive output means connected to said last resonant section, a second magnetostrictive output means connected to one of the plurality of sections between said first and last sections, the phase shift characteristic between said magnetostrictive input means and each said magnetostrictive output means being a linear variation between zero and $n\pi$ radians, where $n$ is the number of resonant sections between said input means and each said output means, the bandwidth of said mechanical filter being equal to $\Delta/2$ times the frequency separation between said subcarrier frequencies; the number of input subcarrier frequencies N being equal to $$\frac{\Delta+1}{2}$$

where $\Delta$ is the difference in the number of resonant sections between said magnetostrictive input means and each said magnetostrictive output means of said filter, respectively, the output of said mixer connected to the input means of said filter and comprising N frequencies corresponding to said N input subcarriers, the first and second output means of said filter individually connected to the input of said phase detector, and the output of said phase detector connected to said frequency control means of said variable frequency oscillator to vary the oscillator frequency to prevent frequency drift.

References Cited in the file of this patent

UNITED STATES PATENTS

| | | |
|---|---|---|
| 2,065,565 | Crosby | Dec. 29, 1935 |
| 2,707,233 | Norton | Apr. 26, 1955 |
| 2,717,361 | Doelz | Sept. 6, 1955 |